United States Patent
Shimonagata

(10) Patent No.: US 11,912,163 B2
(45) Date of Patent: Feb. 27, 2024

(54) VEHICLE CONTROL DEVICE

(71) Applicant: Daimler AG, Stuttgart (DE)

(72) Inventor: Takeshi Shimonagata, Kawasaki (JP)

(73) Assignee: Daimler Truck AG, Leinfelden-Echterdingen (DE)

( * ) Notice: Subject to any disclaimer, the term of this patent is extended or adjusted under 35 U.S.C. 154(b) by 247 days.

(21) Appl. No.: 17/599,333

(22) PCT Filed: Feb. 4, 2020

(86) PCT No.: PCT/JP2020/004013
§ 371 (c)(1),
(2) Date: Sep. 28, 2021

(87) PCT Pub. No.: WO2020/202772
PCT Pub. Date: Oct. 8, 2020

(65) Prior Publication Data
US 2022/0194262 A1 Jun. 23, 2022

(30) Foreign Application Priority Data
Mar. 29, 2019 (JP) .................................. 2019-067828

(51) Int. Cl.
*H02J 7/00* (2006.01)
*B60L 58/22* (2019.01)
(Continued)

(52) U.S. Cl.
CPC ............. *B60L 58/22* (2019.02); *B60L 50/60* (2019.02); *H02J 7/0013* (2013.01);
(Continued)

(58) Field of Classification Search
CPC .......... B60L 58/21; B60L 58/22; B60L 50/60; B60L 2240/547; B60L 2250/28;
(Continued)

(56) References Cited

U.S. PATENT DOCUMENTS

| 2012/0083948 A1* | 4/2012 | Tate, Jr. .................. B60L 58/12 701/22 |
| 2014/0117756 A1 | 5/2014 | Takahashi et al. |

(Continued)

FOREIGN PATENT DOCUMENTS

| CN | 103370847 A | 10/2013 |
| CN | 105291870 A | 2/2016 |

(Continued)

OTHER PUBLICATIONS

Japanese Office Action issued in Japanese application No. 2019-067828 dated Jul. 20, 2022, with partial English translation (Ten (10) pages).

(Continued)

*Primary Examiner* — Zixuan Zhou
(74) *Attorney, Agent, or Firm* — Crowell & Moring LLP

(57) ABSTRACT

A vehicle control device includes a voltage information acquisition unit that acquires respective voltage values of a plurality of battery packs, a voltage value comparison unit that compares, when a state of an accelerator pedal of a vehicle is switched from an ON state to an OFF state, a voltage value of an active battery pack that is being used to drive the vehicle with a voltage value of a standby battery pack having a highest voltage value among the battery packs that are not being used to drive the vehicle on a basis of the voltage values acquired by the voltage information acquisition unit, and a selection unit that selects a drive battery pack allowed to perform discharge to drive the vehicle from among the plurality of battery packs on a basis of the comparison by the voltage value comparison unit.

3 Claims, 3 Drawing Sheets

(51) Int. Cl.
  *B60L 50/60* (2019.01)
  *B60L 58/21* (2019.01)
(52) U.S. Cl.
  CPC ............ *H02J 7/0024* (2013.01); *B60L 58/21* (2019.02); *B60L 2240/547* (2013.01); *B60L 2250/28* (2013.01); *H02J 2310/48* (2020.01); *Y02T 10/92* (2013.01)
(58) Field of Classification Search
  CPC .... H02J 7/0013; H02J 7/0024; H02J 2310/48; Y02T 10/92
  USPC ................................. 320/109, 126; 701/22
  See application file for complete search history.

(56) References Cited

U.S. PATENT DOCUMENTS

| | | | |
|---|---|---|---|
| 2015/0202983 A1* | 7/2015 | Le | B60L 50/16 320/109 |
| 2020/0223422 A1* | 7/2020 | Ye | B60K 6/485 |

FOREIGN PATENT DOCUMENTS

| | | | |
|---|---|---|---|
| CN | 106740228 A | | 5/2017 |
| JP | 9-140007 A | | 5/1997 |
| JP | 2011-211790 A | | 10/2011 |
| JP | 2014-193094 A | | 10/2014 |
| JP | 2014193094 A | * | 10/2014 |
| JP | 2017-175864 A | | 9/2017 |
| JP | 2018-107922 A | | 7/2018 |
| WO | WO 2014/061052 A1 | | 4/2014 |

OTHER PUBLICATIONS

English-language Extended European Search Report issued in European application No. 20783823.6-1202 / 3937334 PCT/JP2020004013 dated Dec. 2, 2022 (Six (6) pages).
PCT/JP2020/004013, International Search Report dated Apr. 28, 2020 (Two (2) pages).
Chinese-language Chinese Office Action issued in Chinese Application No. 202080025368.7 dated Sep. 11, 2023, with partial English translation (10 pages).

* cited by examiner

VEHICLE CONTROL DEVICE

TECHNICAL FIELD

The present invention relates to a vehicle control device.

BACKGROUND ART

In recent years, vehicles not including an internal combustion engine and being driven only with an electric motor have been developed also in the field of commercial vehicles such as trucks from the viewpoint of reducing environmental loads. It has been proposed that a battery module, in which a plurality of battery packs are connected in parallel to each other, is mounted in such vehicles in order to increase battery capacity and ensure a cruising distance.

A battery module composed of a plurality of battery packs may exhibit the occurrence of a voltage fluctuation between the battery packs accompanied by a charging amount (SOC: State Of charge) due to a degradation degree, a difference in a natural discharge rate, or the like. When a voltage fluctuation occurs between the battery packs by a prescribed value or more, a situation in which the contactors of all the battery packs cannot be closed may occur.

In a vehicle in which a battery module as described above is mounted, it is considered that when a voltage fluctuation occurs between battery packs by a prescribed value or more at the start of traveling, a battery pack that has the highest voltage is used first from among a plurality of battery packs, and that when a difference between a voltage value of an active battery pack and a voltage value of another battery pack becomes less than the prescribed value, both the contactors of these battery packs are closed.

CITATION LIST

Patent Literature

[PTL 1] Japanese Patent Application Laid-open No. 2018-107922

SUMMARY OF INVENTION

Technical Problem

However, each of the contactors cannot be controlled in a period of discharge of the active battery pack, therefore, in a case in which the magnitude relationship between voltage values of the respective battery packs is reversed and a voltage difference between the voltage values reaches a prescribed value or more in the period of discharge, both the contactors cannot be closed. That is, a battery pack that was not used at the start of traveling remains unused due to missing of timing to control closing of a contactor. In such a case, the vehicle cannot use up the power capacity of all the battery packs mounted therein and a cruising distance thereof may be restricted.

The present invention has been made in view of such circumstances and has an object of providing a vehicle control device capable of ensuring the cruising distance of a vehicle.

Solution to Problem

A vehicle control device according to the present invention is a vehicle control device controlling a vehicle including a plurality of battery packs connected in parallel to each other and a drive motor to which power is supplied from the battery packs, the vehicle control device including: a voltage information acquisition unit that acquires respective voltage values of the plurality of battery packs; a voltage value comparison unit that compares, when a state of an accelerator pedal of the vehicle is switched from an ON state to an OFF state, a voltage value of an active battery pack that is being used to drive the vehicle with a voltage value of a standby battery pack having a highest voltage value among the battery packs that are not being used to drive the vehicle on a basis of the voltage values acquired by the voltage information acquisition unit; and a selection unit that selects a drive battery pack allowed to perform discharge to drive the vehicle from among the plurality of battery packs on a basis of the comparison by the voltage value comparison unit, wherein the selection unit selects both the active battery pack and the standby battery pack as drive battery packs when a voltage difference between the active battery pack and the standby battery pack is less than a prescribed value.

Further, in the vehicle control device according to the present invention, the selection unit may select only the standby battery pack as a drive battery pack when a voltage difference between the active battery pack and the standby battery pack is the prescribed value or more and a voltage value of the standby battery pack is higher than a voltage value of the active battery pack.

In the vehicle control device according to the present invention, the selection unit may continuously select only the active battery pack as a drive battery pack when a voltage difference between the active battery pack and the standby battery pack is the prescribed value or more and a voltage value of the active battery pack is higher than a voltage value of the standby battery pack.

A vehicle control device compares voltage values of a plurality of battery packs, which are connected in parallel to each other, at timing at which the accelerator pedal of a vehicle is switched to an OFF state, and selects a battery pack having the highest voltage value as a drive battery pack when a voltage difference is a prescribed value or more. Further, when the voltage difference is less than the prescribed value, the vehicle control device selects the respective battery packs as drive battery packs and performs control to close respective contactors, thereby making the vehicle travel using the respective battery packs simultaneously.

Thus, the possibility that a battery pack that was not used at the start of traveling remains unused due to inability of performing the close control of a contactor in the process of the traveling of a vehicle can be reduced. Therefore, a vehicle control device according to the present invention can ensure the cruising distance of a vehicle.

DESCRIPTION OF EMBODIMENTS

Hereinafter, an embodiment of the present invention will be described in detail with reference to the drawings. Note that the present invention is not limited to the following contents but may be arbitrarily modified to be performed so long as its gist remains the same. Further, since all the drawings used to describe the embodiment schematically show constituting members and make a partial emphasis, enlargement, contraction, omission, or the like to deepen understanding, the scales, shapes, or the like of the constituting members are not correctly expressed in some cases.

Figure 1:
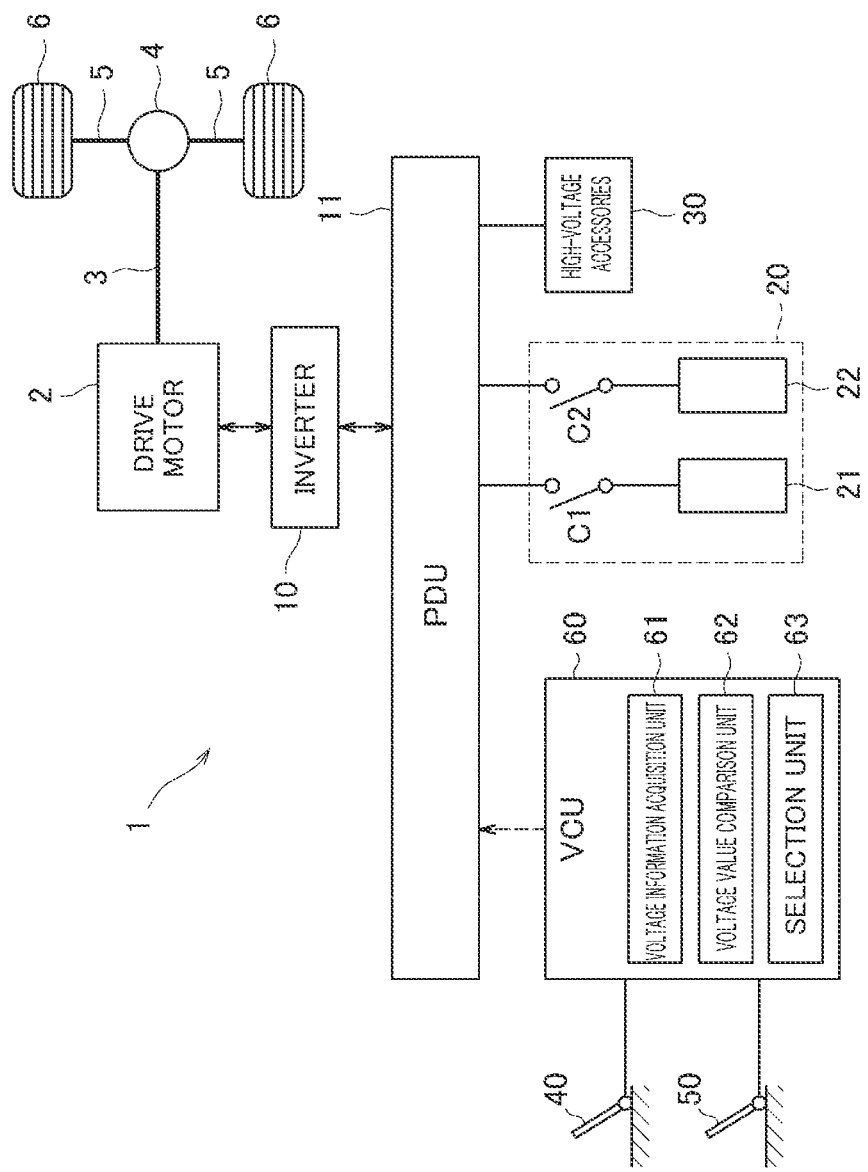
FIG. 1 is a system configuration diagram of a vehicle including a vehicle control device according to the present invention.

FIG. 1 is a system configuration diagram of a vehicle 1 including a vehicle control device according to the present invention. The vehicle 1 is an electric automobile truck (that is, an electric truck) including a drive motor 2 serving as a traveling drive source. Note that the vehicle 1 is not limited to a truck type but may be a general passenger automobile, a bus, or any other automobile type so long as the vehicle 1 includes a motor serving as a traveling drive source.

Further, the vehicle 1 according to the present embodiment includes the drive motor 2, a propeller shaft 3, a differential gear 4, drive shafts 5, drive wheels 6, an inverter 10, a PDU 11, a battery module 20, high-voltage accessories 30, an accelerator pedal 40, a brake pedal 50, and a VCU 60 serving as the "vehicle control device." Note that the vehicle 1 includes components provided in a conventional motor-driven truck as required, besides the configurations described above.

The drive motor 2 is, for example, a motor capable of operating also as a power generator like a permanent magnetic synchronous motor. The output shaft of the drive motor 2 is coupled to the differential gear 4 via the propeller shaft 3, and the right and left drive wheels 6 are coupled to the differential gear 4 via the drive shafts 5. Further, the drive motor 2 is connected to the battery module 20 and the high-voltage accessories 30 via the inverter 10 and the PDU 11. Note that although not shown in the figure, the drive motor 2 may be coupled to the differential gear 4 via a gear box such as a reduction gear instead of the propeller shaft 3.

Then, DC power output from the battery module 20 via the PDU 11 is supplied to the drive motor 2 after being converted into AC power by the inverter 10, and a drive force generated by the drive motor 2 is transmitted to the drive wheels 6 to make the vehicle 1 travel. Further, for example, when the vehicle 1 reduces speed or travels on a downhill (during regenerative travel), the drive motor 2 may function as a power generator using reverse drive from the drive wheels 6 (regenerative drive). In this case, a negative drive force generated by the drive motor 2 is transmitted to the drive wheels 6 as a braking force, while AC power generated by the drive motor 2 is charged into the battery module 20 via the PDU 11 after being converted into DC power by the inverter 10.

Here, the PDU 11 is a power distribution unit connected to various electric apparatuses mounted in the vehicle 1 and distributes high-voltage power supplied from the battery module 20 to the drive motor 2 or the high-voltage accessories 30. Note that a low-voltage battery may be connected to the PDU 11 via a DC-DC converter (each of the low-voltage battery and the DC-DC converter is not shown in the figure), whereby appropriate power supply to, for example, a device that drives with a low voltage such as the VCU 60 that will be described later is also allowed.

The battery module 20 includes a first battery pack 21 and a second battery pack 22 as "a plurality of battery packs" connected in parallel to each other and a first contactor C1 and a second contactor C2 interposed between the respective battery packs and the PDU 11. The first battery pack 21 and the second battery pack 22 are secondary batteries that supply power as energy sources used mainly to drive the vehicle 1 and are, for example, lithium-ion batteries.

Here, the number of battery packs included in the battery module 20 is not considered so long as a plurality of battery packs are included and may be changed as required on the basis of power capacity or the like for the vehicle 1. Further, the first contactor C1 and the second contactor C2 can control the supply and interruption of power from the first battery pack 21 and the second battery pack 22 to the PDU 11, respectively, as they are controlled to be opened and closed.

The high-voltage accessories 30 are electric apparatuses such as an air conditioner and a power steering apparatus and operate when receiving high-voltage power via the PDU 11.

The accelerator pedal 40 and the brake pedal 50 are operation mechanisms that are provided in the driver's seat of the vehicle 1 and used by a driver to perform an acceleration operation and a deceleration operation, respectively, and operation information on the accelerator pedal 40 and the brake pedal 50 is output to the VCU 60.

The VCU 60 is a vehicle control unit that includes an input/output unit, a storage unit (such as a ROM and a RAM) subjected to the storage of a control program, a control map, or the like, a central processing unit (CPU), a timer counter, or the like (each of which is not shown in the figure) and is used to perform the state monitoring and control of various components mounted in the vehicle 1 to unify and control the whole vehicle 1. Particularly, the VCU 60 according to the present embodiment includes a voltage information acquisition unit 61, a voltage value comparison unit 62, and a selection unit 63 as will be described in detail later.

The voltage information acquisition unit 61 acquires respective voltage values of all the battery packs included in the battery module 20, that is, the first battery pack 21 and the second battery pack 22 in the present embodiment.

The voltage value comparison unit 62 compares voltage values of respective battery packs acquired by the voltage information acquisition unit 61 with each other to determine whether a voltage difference between both the battery packs is less than a prescribed value $V_p$ in addition to the magnitude relationship between the respective voltage values. Then, when the voltage difference between both the battery packs is less than the prescribed value $V_p$, the voltage value comparison unit 62 determines that both the contactors can be closed on the supposition that voltages of the battery packs are substantially the same.

Here, the prescribed value $V_p$ is a threshold set in advance as a voltage difference with which security can be satisfactorily ensured even in a case in which the first battery pack 21 and the second battery pack 22 are connected in parallel to each other.

Further, when defining a battery pack that is being used to drive the vehicle 1 as an active battery pack and a battery pack having the highest voltage value among battery packs that are not being used to drive the vehicle 1 as a standby battery pack in a state in which any contactor is open, the voltage value comparison unit 62 compares voltage values of both the battery packs with each other at timing at which the state of the accelerator pedal 40 of the vehicle 1 is switched from ON to OFF.

The selection unit 63 selects a drive battery pack allowed to perform discharge to drive the vehicle 1 from among a plurality of battery packs on the basis of comparison by the voltage value comparison unit 62. That is, in a case in which the contactors of all the battery packs cannot be simultaneously closed, the selection unit 63 selects a battery pack caused to output power required to drive the vehicle 1 according to a situation as will be described in detail later.

Besides, on the basis of, for example, driving operations by a driver via the accelerator pedal 40 and the brake pedal 50, the VCU 60 can manage the exchange of power between components via the PDU 11 and perform general control by a conventional vehicle control device such as controlling the rotation speed of the drive motor 2 via the inverter 10.

Meanwhile, when the state of the ignition switch (not shown in the figure) of the vehicle 1 is OFF, the first contactor C1 and the second contactor C2 are controlled to be closed from the viewpoint of security against high-voltage batteries.

Then, when the ignition switch is switched from OFF to ON, the VCU 60 performs control to close all the contactors on the condition that a voltage difference between all the battery packs included in the battery module 20 is the prescribed value $V_p$. Thus, the vehicle 1 can travel using both the power of the first battery pack 21 and the power of the second battery pack 22.

Further, when a voltage difference between the first battery pack 21 and the second battery pack 22 is the prescribed value $V_p$ or more, the VCU 60 performs control to close the contactor of a battery pack having a higher voltage. Thus, even in a case in which all the contactors cannot be simultaneously closed, the vehicle 1 can start traveling using a battery pack having a higher charging amount (SOC: State Of charge).

However, a situation in which a battery pack electrically isolated by a closed contactor is not selected as a drive battery pack may occur depending on a condition unless the ignition switch is temporarily switched OFF and then switched ON again. For example, when traveling on a highway composed of a relatively gentle uphill road, a driver maintains the accelerator pedal 40 in an ON state for a relatively long time. In such a case, there is a likelihood that a charging amount of an active battery pack continuously reduces and therefore becomes lower than a charging amount of a standby battery pack. In such a case, when a voltage difference between the battery packs is the prescribed value $V_p$ or more, the contactor of the standby battery pack cannot be controlled to be closed and the standby battery pack remains unused during the travel of the vehicle. Therefore, the VCU 60 according to the present invention selects a drive battery pack according to the following procedure to reduce the likelihood of the occurrence of an unused battery pack.

Figure 2:
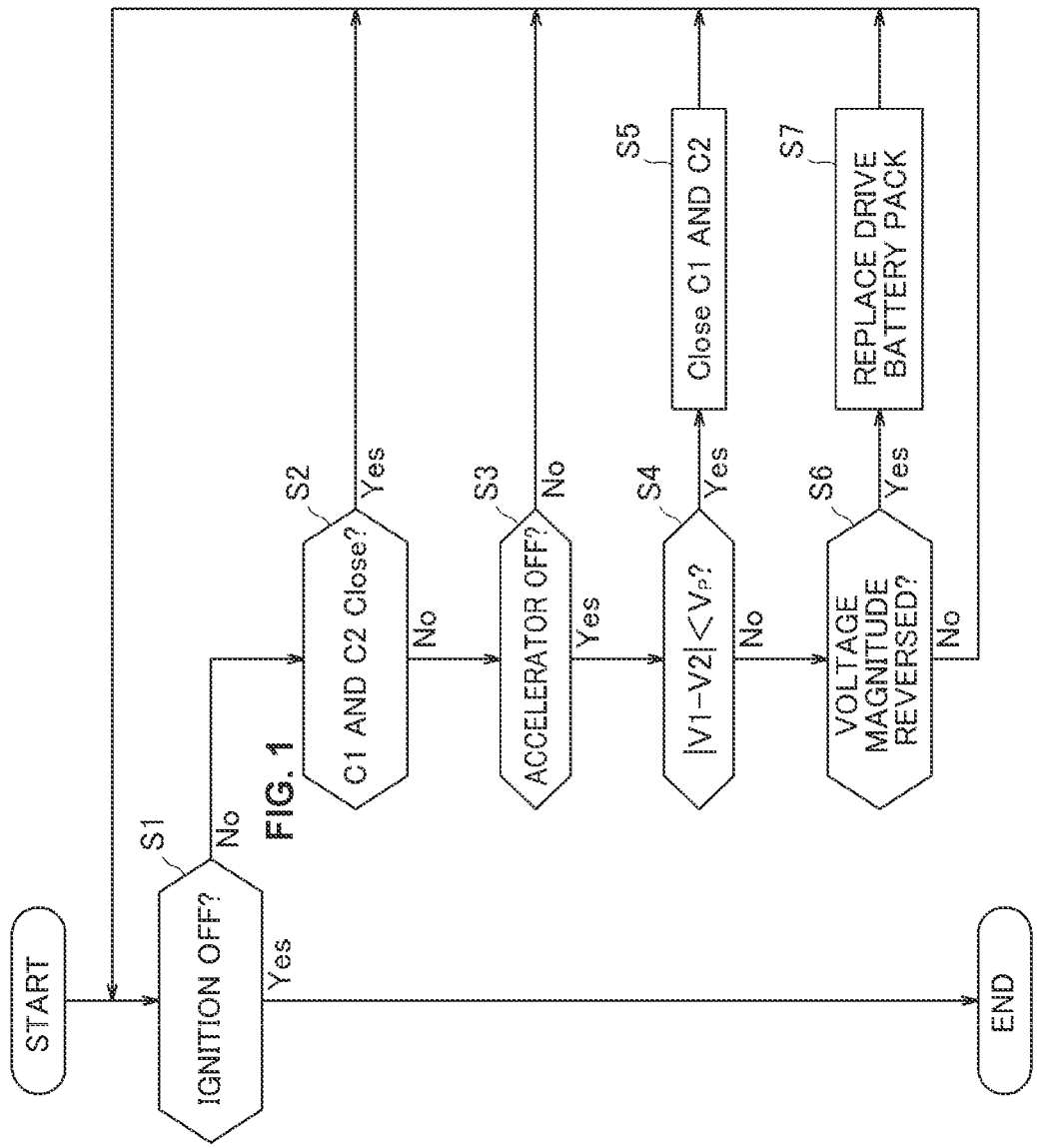
FIG. 2 is a flowchart of battery control performed by the vehicle control device according to the present invention.

FIG. 2 is a flowchart of battery control performed by the vehicle control device according to the present invention. More specifically, FIG. 2 shows a control procedure performed to close the contactors of all the battery packs when the state of the ignition switch is ON.

The VCU 60 starts the control procedure of FIG. 2 on the condition that the ignition switch has been switched from OFF to ON. Here, along with the start of the control procedure, the VCU 60 can perform control to close a part or all of the contactors as described above on the basis of voltage values of the respective battery packs to make the vehicle 1 travel.

Further, the VCU 60 grasps the state of the ignition switch of the vehicle 1 (step S1) and ends the control procedure on the condition that the ignition switch has been switched from ON to OFF (Yes in step S1).

On the other hand, when the state of the ignition switch is ON (NO in step S1), the VCU 60 determines whether all the battery packs, that is, both the first battery pack 21 and the second battery pack 22 are closed (step S2).

When it is determined in step S2 that all the battery packs are closed (Yes in step S2), the VCU 60 determines that further close control of the contactors is not required and returns to step S1 again. Here, since the possibility of the occurrence of a voltage difference between the respective battery packs due to any reason such as a long-time stop cannot be denied, step S1 and step S2 are repeatedly performed to continue the state monitoring of the respective contactors during a period in which the state of the ignition switch is ON.

On the other hand, when any of the first battery pack 21 and the second battery pack 22 is open (No in step S2), the VCU 60 confirms whether the state of the accelerator pedal 40 is OFF (step S3) to determine timing at which the control of the contactors is allowed.

That is, when the state of the accelerator pedal 40 is ON (No in step S3), the VCU 60 determines timing at which the control of the contactors is not allowed since at least one of the first battery pack 21 and the second battery pack 22 is discharging and returns to step S1 again.

On the other hand, when the state of the accelerator pedal 40 is OFF (Yes in step S3), the VCU 60 determines the timing at which the control of the contactors is allowed with the assumption that both the battery packs are suspending discharge and determines whether a voltage difference between a voltage value V1 of the first battery pack 21 and a voltage value V2 of the second battery pack 22 is less than a prescribed value $V_p$ (step S4).

Here, the VCU 60 may separately detect a current value from the battery module 20 to the PDU 11 and determine that the control of the contactors is allowed at timing at which the current value is zero. In this case, the VCU 60 can collectively monitor power consumption in the high-voltage accessories 30 in addition to, for example, power consumption in the drive motor 2 and is therefore allowed to perform the safer control of the contactors.

Then, when the voltage difference between the voltage value V1 and the voltage value V2 becomes less than the prescribed value $V_p$ with the power consumption of the first battery pack 21 or the second battery pack 22 (Yes in S4), the VCU 60 performs control to close both the first contactor C1 and the second contactor C2 (step S5). Thus, the VCU 60 can make the vehicle 1 travel using both the power of the first battery pack 21 and the power of the second battery pack 22 and returns to step S1 again.

On the other hand, when the voltage difference between the voltage value V1 and the voltage value V2 is the prescribed value $V_p$ or more (No in step S4), the VCU 60 determines whether the magnitude relationship between a voltage value of an active battery pack and a voltage value of a standby battery pack has been reversed (step S6).

Then, when it is determined that the magnitude relationship between the voltage values of both the battery packs has been reversed, the VCU 60 performs control to close the contactor of the standby battery pack after performing control to open the contactor of the active battery pack to replace a drive battery pack used to drive the vehicle 1 (step S7) and returns to step S1 again.

On the other hand, when the magnitude relationship between the voltage values of both the battery packs is maintained, the VCU 60 maintains the active battery pack as a drive battery pack (No in step S6) and returns to step S1 again.

In other words, when a voltage difference between an active battery pack and a standby battery pack is less than the prescribed value $V_p$ (Yes in step S4), the selection unit 63 of the VCU 60 selects both the active battery pack and the standby battery pack as drive battery packs (step S5).

Further, when the voltage difference between the active battery pack and the standby battery pack is the prescribed value $V_p$ or more (Yes No in step S4) and a voltage value of the standby battery pack is higher than that of the active battery pack (Yes in step S6), the selection unit 63 of the VCU 60 selects only the standby battery pack as a drive battery pack (step S7).

Then, when the voltage difference between the active battery pack and the standby battery pack is the prescribed value $V_p$ or more (Yes in step S4) and the voltage value of the active battery pack is higher than that of the standby battery pack (No in step S6), the selection unit 63 of the VCU 60 continuously selects only the active battery pack as a drive battery pack.

Figure 3:
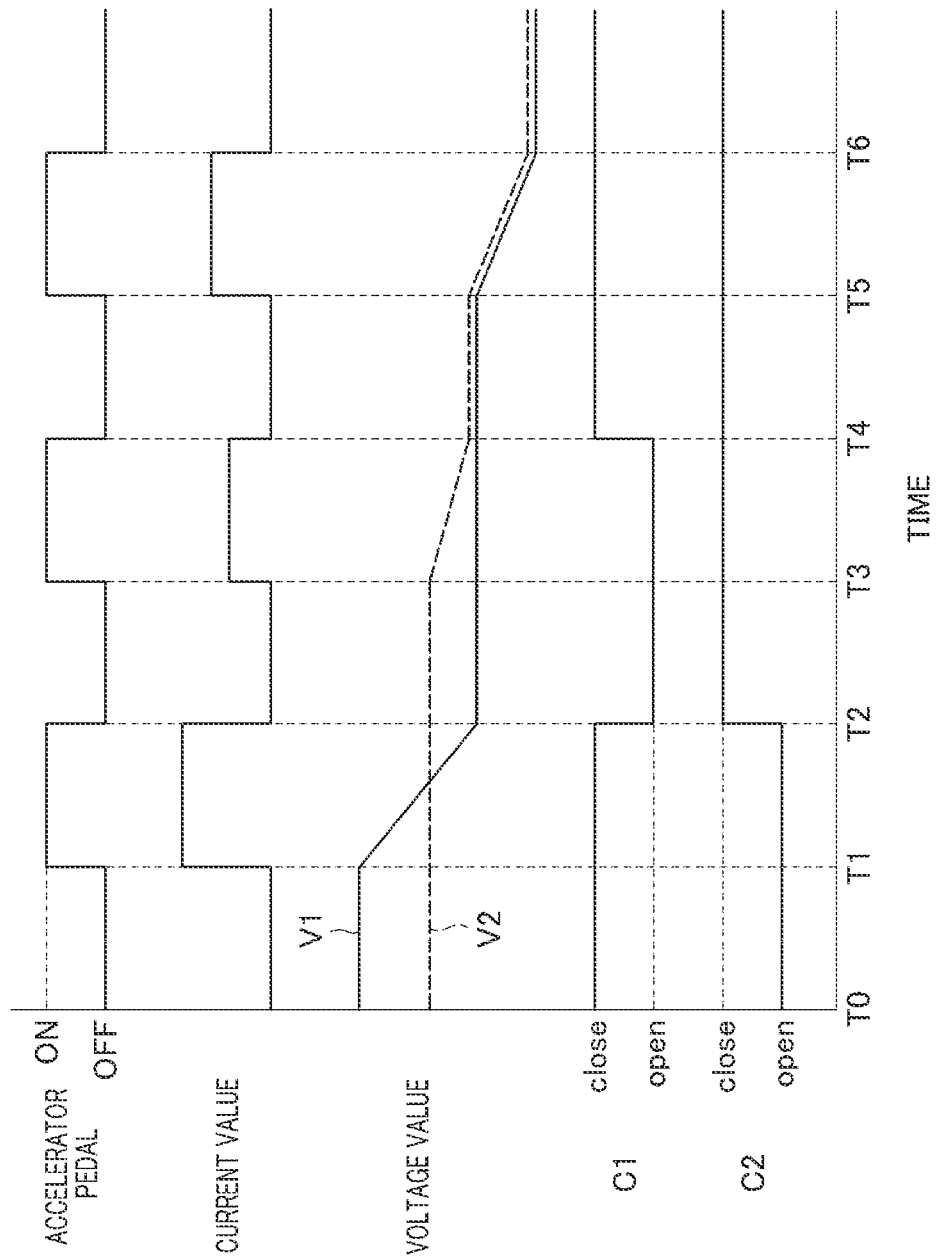
FIG. 3 is a timing flowchart showing an example of the input/output signal of the vehicle control device according to the present invention.

Next, the control of the first contactor C1 and the second contactor C2 with respect to the travel conditions of the vehicle 1 will be described. FIG. 3 is a timing flowchart showing an example of the input/output signal of the vehicle control device according to the present invention.

More specifically, FIG. 3 shows the elapse of time in a horizontal axis and shows a change in the state of the accelerator pedal 40, a change in a current value of a current output from the battery module 20, a change in voltage values of the respective battery packs, and a change in the states of the respective contactors after the ignition switch of the vehicle 1 has been switched from OFF to ON at timing T0.

Here, a case in which the ignition switch of the vehicle 1 is switched ON in a state in which a voltage value V1 of the first battery pack 21 is higher than a voltage value V2 of the second battery pack 22 and a voltage difference is a prescribed value $V_p$ or more will be illustrated.

Since the voltage value V1 is greater than the voltage value V2 at the timing T0, the VCU 60 selects the first battery pack 21 as a drive battery pack and performs control to close only the first contactor C1.

Then, when the driver of the vehicle 1 switches ON the accelerator pedal at timing T1, a current value of a current output from the battery module 20 increases according to the acceleration of the vehicle 1 and the vehicle 1 is driven to travel while consuming the power of the first battery pack 21.

Here, in the example shown in FIG. 3, the magnitude relationship between the voltage value V1 and the voltage value V2 is reversed in a period from the timing T1 to timing T2 in which the accelerator pedal is switched ON. However, the control of the contactors is not allowed in the period.

Therefore, at the timing T2 at which the accelerator pedal is switched OFF, the voltage value comparison unit 62 of the VCU 60 compares a voltage value of the first battery pack 21 serving as an active battery pack with a voltage value of the second battery pack 22 serving as a standby battery pack. Then, when the voltage value V2 is greater than the voltage value V1 and a voltage difference is the prescribed value $V_p$ or more, the selection unit 63 of the VCU 60 newly selects only the second battery pack 22 as a drive battery pack. That is, the selection unit 63 of the VCU 60 performs control to close the second contactor C2 after performing control to open the first contactor C1 at the timing T2.

Thus, the vehicle 1 can travel while consuming the power of the second battery pack 22 at timing T3 at which the accelerator pedal is switched ON again.

Then, when the accelerator pedal is switched OFF at timing T4, the voltage value comparison unit 62 of the VCU 60 compares a voltage value of the second battery pack 22 serving as an active battery pack with a voltage value of the first battery pack 21 serving as a standby battery pack. Then, when it is determined that a voltage difference between the voltage value V1 and the voltage value V2 is less than the prescribed value $V_p$, the selection unit 63 of the VCU 60 newly selects both the first battery pack 21 and the second battery pack 22 as drive battery packs.

Thus, when the contactors of all the battery packs provided in the battery module 20 are closed, the vehicle 1 can travel using all the battery packs simultaneously. That is, the vehicle 1 can evenly consume the power of the first battery pack 21 and the power of the second battery pack 22 as shown in a drive period from timing T5 to timing T6.

As described above, the vehicle control device according to the present invention compares voltage values of a plurality of battery packs, which are connected in parallel to each other, with each other at timing at which the accelerator pedal of the vehicle 1 is switched OFF. When a voltage difference is the prescribed value $V_p$ or more, the vehicle control device selects a battery pack having the highest voltage value as a drive battery pack. Further, when the voltage difference is less than the prescribed value $V_p$, the vehicle control device according to the present invention selects the respective battery packs as drive battery packs and performs control to close the respective contactors of the battery packs to make the vehicle 1 travel using the respective battery packs simultaneously. Thus, the possibility that a battery pack that had not been used at the start of traveling remains unused since the close control of a contactor is not allowed in the process of the traveling of the vehicle 1 can be reduced. Therefore, the vehicle control device according to the present invention can ensure the cruising distance of the vehicle 1.

The description of the embodiment ends here, but the present invention is not limited to the above embodiment. For example, a mode in which two battery packs are included in the battery module 20 is illustrated in the above embodiment, but more battery packs may be mounted. That is, even in a case in which a plurality of battery packs that are not being used to drive the vehicle 1 exist, the voltage value comparison unit 62 of the VCU 60 can select a battery pack having the highest voltage value among the battery packs as a standby battery pack and compare the voltage value with a voltage value of an active battery pack to perform control in the same procedure as that of the above embodiment.

REFERENCE SIGNS LIST

1 Vehicle
2 Drive motor
3 Propeller shaft
4 Differential gear
5 Drive shaft
6 Drive wheel
10 Inverter
11 PDU
20 Battery module
21 First battery pack
22 Second battery pack
C1 First contactor
C2 Second contactor
30 High-voltage accessories
40 Accelerator pedal
50 Brake pedal
60 VCU
61 Voltage information acquisition unit 62 Voltage value comparison unit
63 Selection unit

The invention claimed is:

1. A vehicle control device controlling a vehicle including a plurality of battery packs connected in parallel to each other, a drive motor to which power is supplied from the battery packs, and respective contactors interposed between the plurality of battery packs and the drive motor, comprising:
- a voltage information acquisition unit that acquires respective voltage values of the plurality of battery packs;
- a voltage value comparison unit that compares, when a state of an accelerator pedal of the vehicle is switched from an ON state to an OFF state, a voltage value of an active battery pack that is being used to drive the vehicle with a voltage value of a standby battery pack having a highest voltage value among the battery packs that are not being used to drive the vehicle on a basis of the voltage values acquired by the voltage information acquisition unit; and
- a selection unit that selects a drive battery pack allowed to perform discharge to drive the vehicle from among the plurality of battery packs on a basis of the comparison by the voltage value comparison unit;
- wherein opening and closing of each of the contactors is controlled according to a selection by the selection unit;
- wherein the selection unit selects, when the state of the accelerator pedal of the vehicle is switched from the ON state to the OFF state, both the active battery pack and the standby battery pack as drive battery packs when a voltage difference between the active battery pack and the standby battery pack is less than a prescribed value.

2. The vehicle control device according to claim 1, wherein the selection unit selects, when the state of the accelerator pedal of the vehicle is switched from the ON state to the OFF state, only the standby battery pack as a drive battery pack when a voltage difference between the active battery pack and the standby battery pack is the prescribed value or more and a voltage value of the standby battery pack is higher than a voltage value of the active battery pack.

3. The vehicle control device according to claim 1, wherein the selection unit continuously selects, when the state of the accelerator pedal of the vehicle is switched from the ON state to the OFF state, only the active battery pack as a drive battery pack when a voltage difference between the active battery pack and the standby battery pack is the prescribed value or more and a voltage value of the active battery pack is higher than a voltage value of the standby battery pack.

* * * * *